(12) United States Patent
Yanase et al.

(10) Patent No.: US 7,825,323 B2
(45) Date of Patent: Nov. 2, 2010

(54) ELECTRICAL MUSIC APPARATUS CAPABLE OF CONNECTING WITH EXTERNAL DEVICE

(75) Inventors: Tsutomu Yanase, Hamamatsu (JP); Harumichi Hotta, Hamamatsu (JP); Atsushi Fukada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 426 days.

(21) Appl. No.: 11/198,622

(22) Filed: Aug. 5, 2005

(65) Prior Publication Data

US 2006/0037457 A1     Feb. 23, 2006

(30) Foreign Application Priority Data

Aug. 6, 2004  (JP) .............................. 2004-230675
Aug. 6, 2004  (JP) .............................. 2004-230930

(51) Int. Cl.
  *G10H 7/00*    (2006.01)
(52) U.S. Cl. .............................. 84/645; 84/600; 84/602; 84/615
(58) Field of Classification Search .................. 84/645, 84/600, 602, 615
  See application file for complete search history.

(56) References Cited

U.S. PATENT DOCUMENTS

| | | | |
|---|---|---|---|
| 5,630,076 A | 5/1997 | Saulpaugh et al. | |
| 5,802,365 A | 9/1998 | Kathail et al. | |
| 6,505,258 B1 * | 1/2003 | Sakarda et al. | ................. 710/18 |
| 6,671,749 B2 | 12/2003 | Williams et al. | |
| 2004/0055445 A1 | 3/2004 | Iyoku et al. | |
| 2004/0068549 A1 * | 4/2004 | Motoyama | ................. 709/208 |
| 2004/0123188 A1 | 6/2004 | Srinivasan et al. | |
| 2004/0133709 A1 * | 7/2004 | Boehm et al. | ................. 710/15 |

(Continued)

FOREIGN PATENT DOCUMENTS

CN       1325062 A     12/2001

(Continued)

OTHER PUBLICATIONS

"Finding Compatible Device Drivers for Windows XP" by Charlie Russel, Oct. 14, 2002; http://web.archive.org/web/20040617032217/http://www.microsoft.com/windowsxp/using/helpandsupport/learnmore/russel_02october14.mspx.*

(Continued)

*Primary Examiner*—Walter Benson
*Assistant Examiner*—Kawing Chan
(74) *Attorney, Agent, or Firm*—Morrison & Foerster LLP

(57) ABSTRACT

An electric music apparatus comprises an interface for connecting an external device, a memory that stores device drivers for external devices connected to the interface and a list recording relationships between external devices and corresponding device drivers, an obtaining device that obtains an external device information from an connected external device, a searching device that searches a device driver corresponding to the connected external device with reference to the list in accordance with the obtained external device information; a first determining device that determines the device driver corresponding to the connected external device when the searching device detects the corresponding device driver from the list, and a second determining device that executes a specific command to the connected external device by using a device driver stored in the memory when the searching device cannot detect the corresponding device driver and determines a driver without an error as a corresponding driver.

7 Claims, 4 Drawing Sheets

U.S. PATENT DOCUMENTS

2004/0205393 A1* 10/2004 Kitamorn et al. .............. 714/20
2005/0248792 A1* 11/2005 Wright ..................... 358/1.13
2006/0047859 A1* 3/2006 Cavalaris et al. .............. 710/8

FOREIGN PATENT DOCUMENTS

| EP | 1 296 235 | 3/2003 |
|---|---|---|
| EP | 0 774 137 | 10/2003 |
| JP | 09-190312 A | 7/1997 |
| JP | 11-288398 A | 10/1999 |
| JP | 2003-122353 A | 4/2003 |
| JP | 2003-256348 | 9/2003 |
| WO | WO-96/35170 | 11/1996 |

OTHER PUBLICATIONS

Notice of Reasons of Rejection mailed Jul. 14, 2009, for JP Application No. 2004-230930, English Translation, three pages.
Notice of Reasons of Rejection mailed Jul. 14, 2009, for JP Application No. 2004-230930, English Translation, three pages.

* cited by examiner

FIG. 2A

| VENDOR ID | PRODUCT ID | DRIVER ID |
|---|---|---|
| #2 (COMPANY A) | #5 (PRODUCT A) | #1 (DRIVER A) |
| #2 (COMPANY A) | #6 (PRODUCT B) | #1 (DRIVER A) |
| #10 (COMPANY B) | #21 (PRODUCT C) | #1 (DRIVER A) |
| #10 (COMPANY B) | #22 (PRODUCT D) | #2 (DRIVER B) |
| #83 (COMPANY C) | #30 (PRODUCT E) | #3 (DRIVER C) |
| : | : | : |

SEARCHING SEQUENCE ↓

| VENDOR ID | PRODUCT ID | DRIVER ID |
|---|---|---|
| #2 (COMPANY A) | #7 (PRODUCT F) | #0 (NO DRIVER) |
| #10 (COMPANY B) | #23 (PRODUCT H) | #0 (NO DRIVER) |
| #2 (COMPANY A) | #8 (PRODUCT I) | #1 (DRIVER A) |
| #10 (COMPANY B) | #24 (PRODUCT J) | #2 (DRIVER B) |
| #83 (COMPANY C) | #31 (PRODUCT G) | #3 (DRIVER C) |
| : | : | : |

SEARCHING SEQUENCE ↓

CL2

ELECTRICAL MUSIC APPARATUS CAPABLE OF CONNECTING WITH EXTERNAL DEVICE

CROSS REFERENCE TO RELATED APPLICATION

This application is based on Japanese Patent Application 2004-230930, filed on Aug. 6, 2004, and Japanese Patent Application 2004-230930, filed on Aug. 6, 2004, the entire contents of which are incorporated herein by reference.

BACKGROUND OF THE INVENTION

A) Field of the Invention

The present invention relates to an electrical music apparatus and specifically relates to an electrical music apparatus that can be used while connecting with an external device.

B) Description of the Related Art

Conventionally, functions of an electric music apparatus such as an electronic musical instrument, a musical tone generator, a mixer, etc. have been extended by inserting an external device such as a LAN-card, etc. into its extended slot. In order to use the external device under control of the electrical music apparatus, a device driver (hereinafter called the driver) corresponding to the external device must be installed to the electrical music apparatus.

Generally, the driver is installed by selecting from built-in drivers pre-stored in the electric music apparatus. When the driver corresponding to the external device can not be found in the built-in drivers, the installation of the driver will be executed by loading it from a storage medium distributed with the external device in a form of a CD-ROM or the likes to the electric music apparatus, or by downloading it from a server via a public network such as the Internet to the electric music apparatus.

A communication setting apparatus that detects a driver corresponding to the connected (inserted) external device automatically from a plurality of drivers stored in the apparatus is well known. The communication setting apparatus transmits data to the external device by using each one of the plurality of the drivers and judges that each driver supports the external device by detecting responses from the eternal device (e.g., refer to Japanese Laid-open Patent No. 2003-256348).

In the above-described type of the communication setting apparatus, even if an external device of which compatibility with the communication setting apparatus has been already assured is connected, the detections and judgments are carried out for every built-in drivers; therefore, the automatic installation of the driver takes a long time.

SUMMARY OF THE INVENTION

It is an object of the present invention to provide an electric music apparatus that can quickly determine a device driver for connected external device.

According to one aspect of the present invention, there is provided an electric music apparatus, comprising: an interface to which an external device can connect; a memory that stores device drivers for operating external devices connected to the interface and a list recording relationship between external devices and corresponding device drivers; an obtaining device that obtains external device information from an external device connected to the interface; a searching device that searches a device driver corresponding to the connected external device with reference to the list in accordance with the obtained external device information; a first determining device that determines to control the connected external device by using the device driver corresponding to the connected external device when the searching device detects the corresponding device driver from the list; and a second determining device that executes a specific command to the connected external device by using a device driver stored in the memory when the searching device cannot detect the corresponding device driver and determines to control the connected external device by using a device driver that makes the external device respond to the specific command without an error.

According to the present invention, an electric music apparatus that can quickly determine a device driver for connected external device can be provided.

BRIEF DESCRIPTION OF THE DRAWINGS

FIG. 2A and FIG. 2B are schematic diagrams showing operation confirmed drivers lists according to the embodiment of the present invention.

DETAILED DESCRIPTION OF THE PREFERRED EMBODIMENTS

Figure 1:
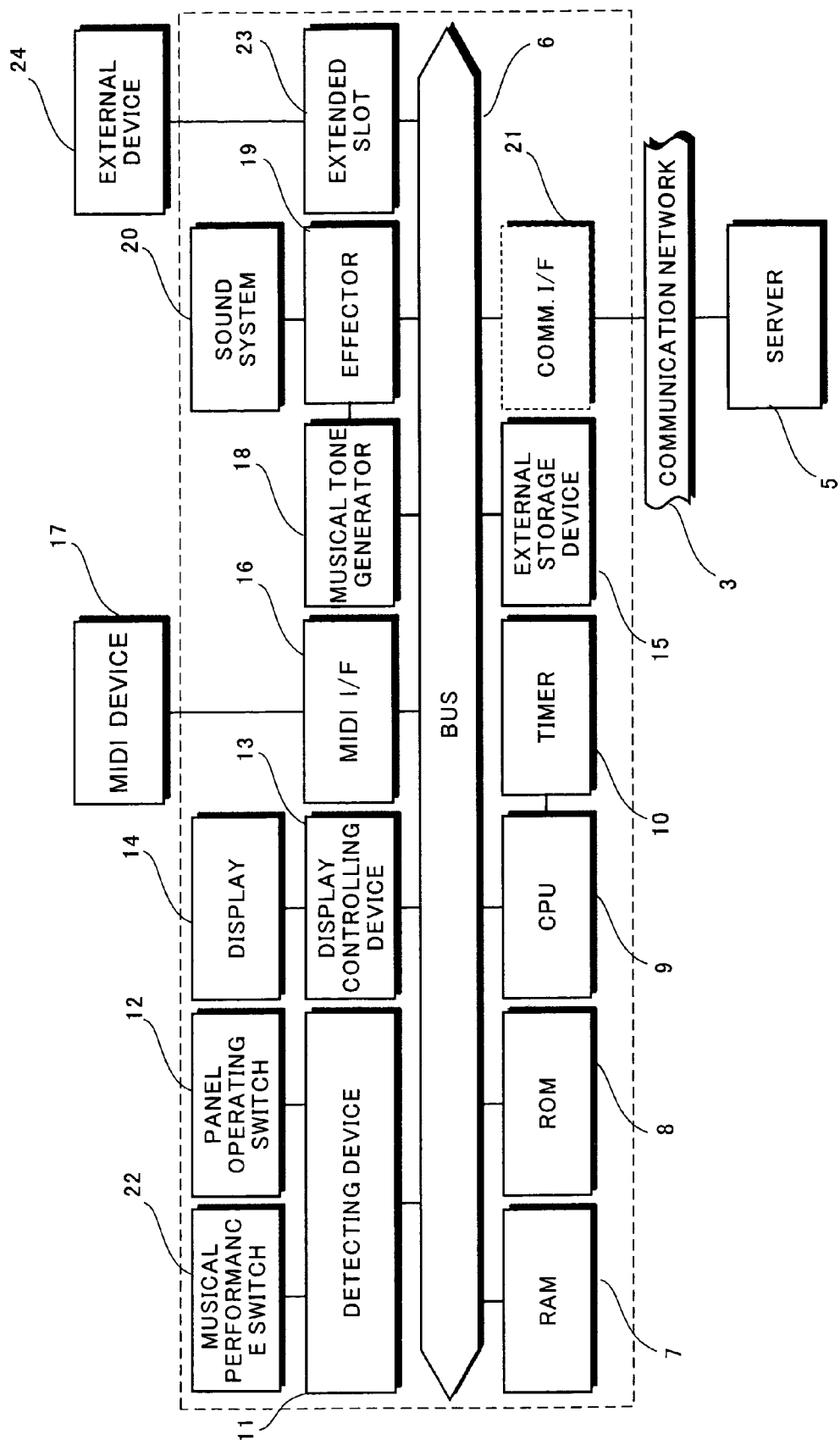
FIG. 1 is a block diagram showing a hardware structure of an electric music apparatus 1 according to an embodiment of the present invention.

FIG. 1 is a block diagram showing a hardware structure of an electric music apparatus 1 according to an embodiment of the present invention.

The electric music apparatus 1 is an electronic device for executing a process relating music such as an electronic musical instrument like a musical keyboard, a musical tone generator, a PA device like a mixer or a recorder, and an audio-visual device like a stereo component system, etc.

The electric music apparatus 1 is consisted of a bus 6, a RAM 7, a ROM 8, a CPU 9, a timer 10, a detecting device 11, a panel operating switch 12, a musical performance switch 22, a display control device 13, a display 14, an external storage device 15, a MIDI interface 16, a musical tone generator 18, an effecter 19, a sound system 20 and an extended slot 23.

To the bus 6 are connected the RAM 7, the ROM 8, the CPU 9, the detecting device 11, the display control device 13, the external storage device 15, the MIDI interface 16, the musical tone generator 18, the effecter 19 and the extended slot 23.

The RAM 7 has a buffer region and a working area of the CPU 9 where a flag, a register, various parameters, etc. are stored.

The ROM 8 can store various parameters, various control programs, a program for realizing the embodiment of the present invention, etc. In addition, the ROM 8 can store device drivers (drivers), each supporting at least one of plurality types of external devices 24.

The CPU 9 executes a calculation and controls the electric music apparatus 1 in accordance with the controlling programs and the program for realizing the embodiment stored in the ROM 8 or the external storage device 15. The timer 10 is connected to the CPU 9 and supplies a standard clock signal, an interruption timing, etc. to the CPU 9.

A user can input various parameters and settings by using the panel operating switch 12 connected to the detecting device 11. The panel operating switch may be any type of a switch, for example, a switch, a pad, a fader, a slider, an alpha-numerical keyboard, a mouse, a rotary encoder, a joy stick, a jog shuttle, etc. that can input a signal in accordance with an input operation of the user. In addition, the electric music apparatus may be equipped with a plurality of the panel operating switches of the same type or the different types. Moreover, the panel operating switch 12 may be a software switch displayed on the display 14, which is operated by using other switches like a mouse, etc.

The musical performance switch 22 is connected to the detecting device 11 and supplies a musical performance signal in accordance with a musical performance by a user. A musical keyboard, a pad, etc. can be used as the musical performance switch 22. In addition, the musical performance switch 22 may be any type of switch that can input a musical performance signal in accordance with a musical performance by a user. Moreover, the electric music apparatus may be equipped with a plurality of the musical performance switches 22 of the same type or the different types.

The display controlling device 13 is connected to the display 14 and controls the display 14 to display various information on its screen. A user executes various inputs and settings with reference to the information displayed on the screen of the display 14. Moreover, the display 14 may be an external device connected to the electric music apparatus 1 via a cable, etc.

The MIDI interface (MIDI I/F) 16 can be connected to a MIDI device 17, other electronic musical instrument, an audiovisual device, a computer, etc. and is an interface that can transmit and receive at least a MIDI signal. The MIDI interface (MIDI I/F) 16 is not limited to a dedicated MIDI interface but also may be a general interface based on RS-232C, universal serial bus (USB), IEEE1394 Standards, etc. In this case, other data than a MIDI signal can be simultaneously transmitted or received.

The MIDI device 17 is an electronic musical instrument or an audiovisual device connected to the MIDI interface 16. A type of the MIDI device 17 is not only a keyboard type but also a stringed instrument type, a wind instrument type, a percussion type, etc. In addition, the MIDI device 17 is not only a device equipped with a musical tone generator, an automatic musical performance device etc. in one body but also a group of devices connected by a communication network via a communication interface such as a MIDI interface, USB, IEEE1394, etc.

The musical tone generator 18 generates a sound signal in accordance with music contents store in the ROM 8 or the RAM 7, etc., a musical performance signal supplied from the musical performance switch 22 or from the MIDI device 17 connected to the MIDI interface 16 or a MIDI signal and supplies the sound signal to the sound system 20 via the effecter 19.

The effecter 19 adds various musical effects to the sound signal supplied from the musical tone generator 18.

The sound system 20 converts the supplied digital sound signal to an analogue sound signal by a built-in D/A converter and sounds it by loud speakers.

The extended slot 23 is a general interface for attaching an external device such as a PCI slot, a PCMCIA slot, etc. An external device 24 is connected to the electrical music apparatus 1 via the extended slot 23. The extended slot 23 is not only an extended slot to which the external device 24 is inserted to use but also any type of an interface to which the external device 24 can be connected to use, e.g., USB interface, etc.

The external device 24 is inserted (or connected) to the extended slot 23 to extend a function of the electric music apparatus and is a device commonly available for a use with a personal computer. The external device 24 is preferably a type of device that one device driver can support a plurality of external devices from different vendors because a maker of a built-in chip (processor, etc.) of the external device is limited to small numbers although a multiplicity of vendors (makers) exist, namely, a LAN adaptor (card), an audio interface, USB loudspeakers, a storage device (a semiconductor memory, HDD, FDD, DVD drive, CD-ROM drive, etc.), a modem, a monitor display, an external musical tone generator, etc.

Further, the external device 24 stores external device information including a vendor ID specifying a company (manufacturer or distributor) of the external device 24 and a product ID specifying a product. The external device 24 supplies the external device information to the electric music apparatus 1 upon request. In addition, the external device information is not only consisted of a combination of the vendor ID and the product ID but also any information that can specify the external device 24.

The external storage device 15 includes an interface for an external storage device and is connected to the bus 6 via the interface.

The external storage device 15 has a storage area for storing the later-described user list CL2. As the external device 15, for example, a semiconductor memory such as a flash memory, etc. may be equipped with.

In addition to that, as the external storage device 15, a flexible or floppy (trademark) disk drive (FDD), a hard disk drive (HDD), a magnet optical (MO) drive, a compact disk read only memory (CD-ROM) drive, a digital versatile disc (DVD) drive, etc. may be connected. Furthermore, those drives may be connected via the extended slot 23.

The electric music apparatus 1 may be equipped with a communication interface 21. The communication interface 21 can connect with a communication network 3 such as a local area network (LAN), the Internet, public phone line, etc. and can connect bilaterally with a server 5 via the communication network 3.

The communication interface 21 and the communication network 3 are not only wired but also wireless or a combination of wired and wireless networks. Moreover, the communication interface 21 may be equipped with the electric music apparatus 1 as a built-in device or connected to the electric music apparatus 1 via the extended slot 23 as the external device 24.

By the way, this embodiment is considered to be more effective for the electric music apparatus 1 that is not equipped with an external storage device that is used by inserting an external storage medium and the communication interface 21 at a time of distribution and to which a device driver supplied with the external device 24 is difficult to be installed. Therefore, the external storage device that is used by inserting an external storage medium and the communication interface 21 are not essential to realize the embodiment of the present invention.

FIG. 2A and FIG. 2B are schematic diagrams showing operation confirmed drivers lists according to the embodiment of the present invention. FIG. 2A shows an operation confirmed drivers list (preset list) CL1 stored in the ROM 8 in advance. FIG. 2B shows an operation confirmed drivers list (user list) CL2 created or overwritten by the later-described driver determination process shown in FIG. 4.

Both of the preset list CL1 and the user list CL2 record relationships between the external device information including the vendor ID specifying company and the product ID specifying the product and a driver ID specifying a device driver supporting an external device corresponding to the external device information.

In the user list CL2, an external device that is confirmed not to be used by the electric music apparatus 1 is further recorded as an unsupported device. In this embodiment, the driver ID "#0" means that there is no supporting driver for the external device. The way to show absence of the supporting driver may be any way that the absence of the driver can be recognized.

Figure 3:
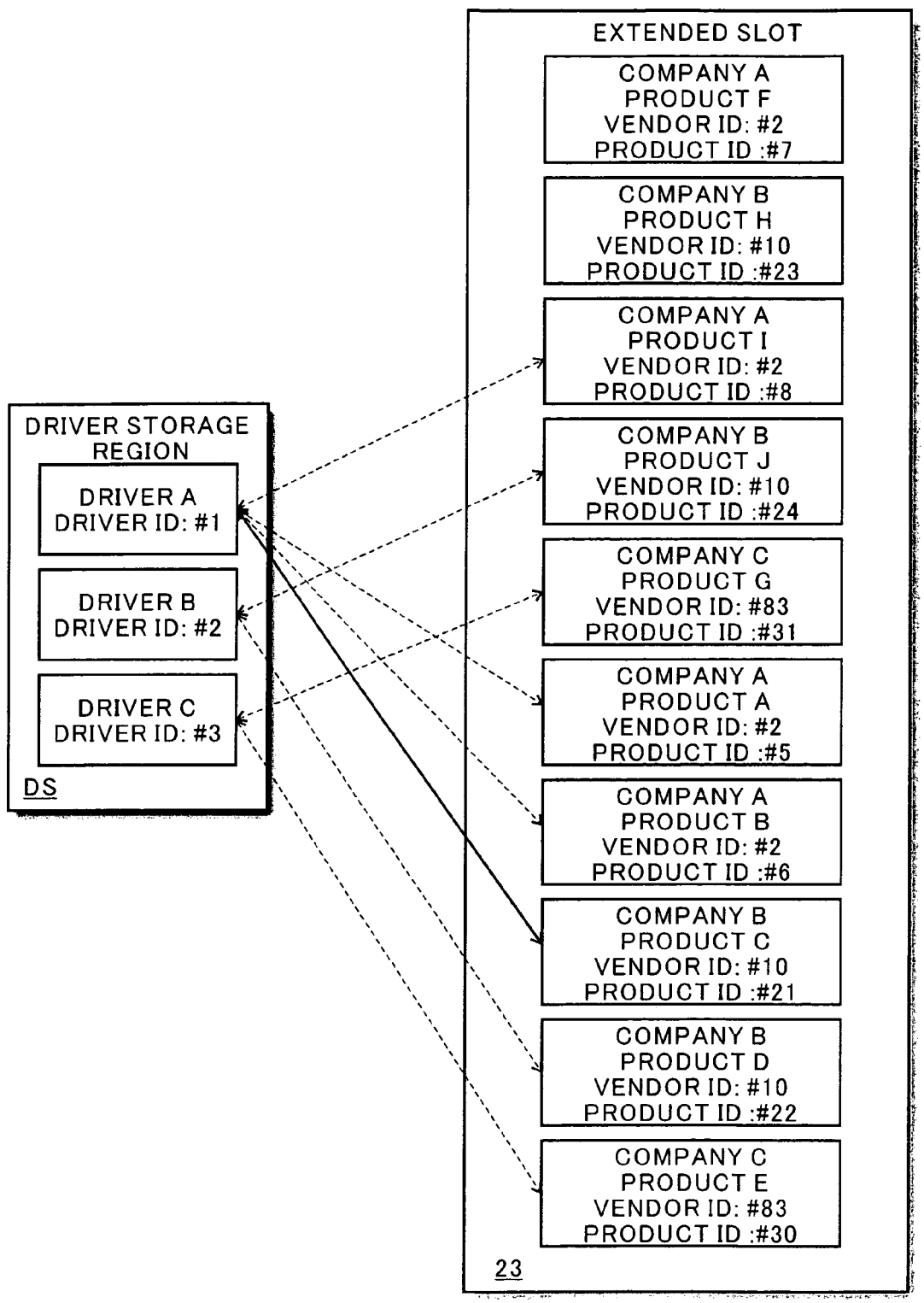
FIG. 3 is a schematic diagram showing relationships between external devices and corresponding drivers listed in the operation confirmed drivers lists shown in FIG. 2.

FIG. 3 is a schematic diagram showing relationships between external devices and corresponding drivers listed in the operation confirmed drivers lists shown in FIG. 2.

The electric music apparatus 1 according to this embodiment has a driver storage region DS, for example, in the ROM 8 shown in FIG. 1 and stores plurality types of device drivers (a driver A, a driver B, a driver C and so on) in the driver storage region DS. In addition, those drivers may be ranked in accordance with compatibility or functions.

For example, when a product A from a company A is inserted into the extended slot 23 shown in FIG. 1, a device driver supporting (corresponding to) the product A is searched the vendor ID "#2" and the product ID "#5" as searching keys at first in the user list CL2 and thereafter in the preset list CL1. Then, it will be found that the device driver corresponding to the vendor ID "#2" and the product ID "#5" is the driver A having the driver ID "#1".

For another example, when a product C from a company B is inserted into the extended slot 23 shown in FIG. 1, a device driver supporting (corresponding to) the product C is searched the vendor ID "#10" and the product ID "#21" as searching keys at first in the user list CL2 and thereafter in the preset list CL1. Then, it will be found that the device driver corresponding to the vendor ID "#10" and the product ID "#21" is the driver A having the driver ID "#1".

In this embodiment, the driver A is recorded as being used for the product A from the company A and the product C from the company B. There are many cases that the same driver can support the products from the different vendors as the above-described examples. Therefore, by storing combination of products and a driver, the electric music apparatus 1 can support much more external devices. Generally, an electric music apparatus is not equipped with a CD-ROM drive, etc. and cannot be connect with the Internet, etc., and so a device driver completely supporting the external device is difficult to be installed.

Therefore, a relationship (combination) between the external device and the device driver is stored even if the vendor of the external device does not distribute the driver as far as the driver can use the external device.

Further, for example, when a product G from a company C is inserted into the extended slot 23 shown in FIG. 1, a device driver supporting (corresponding to) the product G is searched the vendor ID "#83" and the product ID "#31" as searching keys at first in the user list CL2 and thereafter in the preset list CL1. Then, it will be found that the device driver corresponding to the vendor ID "#83" and the product ID "#31" is the driver C having the driver ID "#3".

Moreover, for example, when a product F from the company A is inserted into the extended slot 23 shown in FIG. 1, a device driver supporting (corresponding to) the product F is searched the vendor ID "#2" and the product ID "#7" as searching keys at first in the user list CL2 and thereafter in the preset list CL1. Then, it will be found that the device driver corresponding to the vendor ID "#2" and the product ID "#7" is a driver having the driver ID "#0", that is, the driver supporting the product F is not stored in the driver storage region DS. For other external devices, the corresponding drives are determined with reference to the operation confirmed drivers lists as similar to the external devices in the above-described examples, and their relationships will be as shown in the drawing.

Figure 4:
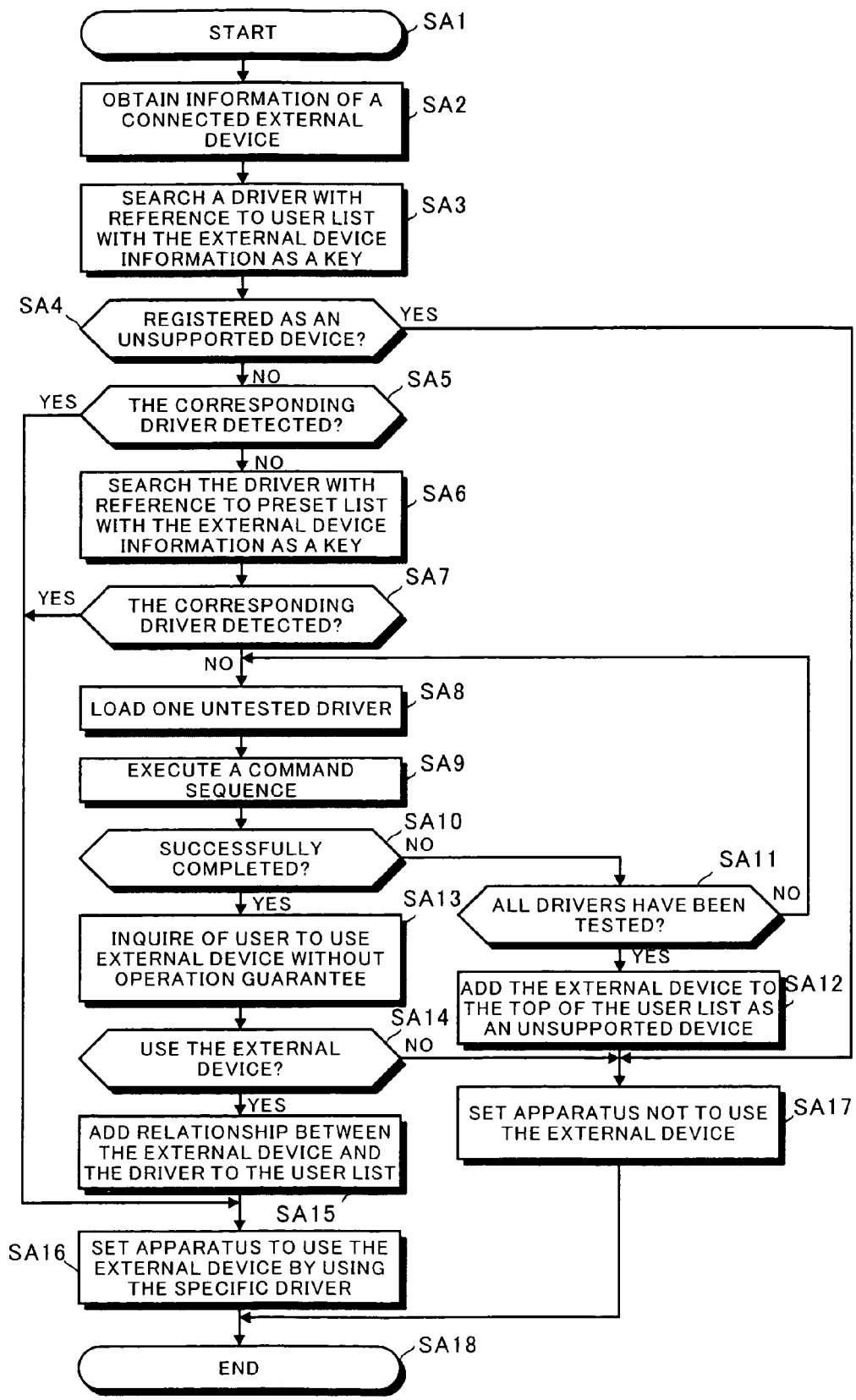
FIG. 4 is a flowchart showing a driver determination process according to the embodiment of the present invention.

FIG. 4 is a flowchart showing a driver determination process according to the embodiment of the present invention. This process is executed by the CPU 9 in accordance with the program stored in the ROM 8, etc. of the electric music apparatus 1. Further, the driver determination process is started when the electric music apparatus 1 is turned on, setting relating to the external device is executed, connection of a new external device 24 is detected or at a time of usage of the external device by a user. The time of usage of the external device is, for example, a time when the user starts browsing software to connect with the Internet, etc. if the external device is a LAN adaptor or a modem.

At Step SA1, the driver determination process is started. At Step SA2, information of an un-configured external device 24 connected (or newly connected) to the extended slot 23 (FIG. 1) is obtained. The information obtained at this step is, for example, the vendor ID and the product ID stored in the external device 24. The vendor ID and the product ID uniformly are called the external device information.

At Step SA3, a device driver supporting (corresponding to) the external device 24 is searched with reference to, for example, the operation confirmed drivers list (user list) CL2 shown in FIG. 2B with the external device information obtained at Step SA2 as keys. In this embodiment, the searching is executed from the top of the user list CL2 and stopped when the corresponding driver is found.

At Step SA4, it is judged that the external device of which driver is searched at Ste SA3 is registered as an unsupported device (e.g., the driver ID corresponding to the external device is "#0") in the user list CL2 or not. When the external device is an unsupported device, the process advances to Step SA 17 as directed by an arrow marked "YES". When the external device is not an unsupported device, the process advances to Step SA 5 as directed by an arrow marked "NO".

At Step SA5, It is judged whether the device driver supporting (corresponding to) the external device 24 is found by the searching at Step SA3 or not. When the corresponding driver is detected (found), the process advances to Step SA16 as directed by an arrow marked "YES". When the corresponding driver is not detected (found), the process advances to Step SA6 as directed by an arrow marked "NO".

At Step SA6, the device driver supporting (corresponding to) the external device 24 is searched with reference to, for example, the operation confirmed drivers list (preset list) CL1 shown in FIG. 2A with the external device information obtained at Step SA2 as keys. In this embodiment, the searching is executed from the top of the preset list CL1 and stopped when the corresponding driver is found.

At Step SA7, It is judged whether the device driver supporting (corresponding to) the external device 24 is found by the searching at Step SA6 or not. When the corresponding driver is detected (found), the process advances to Step SA16 as directed by an arrow marked "YES". When the corresponding driver is not detected (found), the process advances to Step SA8 as directed by an arrow marked "NO".

At Step SA8, a device driver that has not been tested (untested driver) is loaded from the driver storage region DS. In this embodiment, a plurality of the device drivers are stored in the driver storage region DS, and the device drivers may be ranked with priory sequence to be loaded. For example, a driver with higher performance may have priority over others to be selected more frequently or a driver with higher compatibility or with higher availability may have priority over others to increase processing speed for testing the drivers.

At Step SA9, a specific command sequence is executed by using the device driver loaded at Step SA8. The specific command sequence executed at this step may be initialization of the external device. Commands sent to the external device for the specific commands sequence (e.g., the initialization process) are different depending on the device drivers; therefore, the specific commands sequence (e.g., the initialization process) cannot be completed (the external device does not respond or responds to the specific command with an error message) when a device driver not supporting (corresponding to) the external device is used.

At Step SA10, it is judged whether the specific commands sequence (e.g., the initialization process) executed at Step SA9 is completed or not. When the command sequence is successfully executed, the process advances to Step SA13 as directed by an arrow marked "YES". When the command sequence is not successfully executed, that is, it turns to be error, the process advances to Step SA11 as directed by an arrow marked "NO".

At Step SA11, it is judged whether the testing for all the device drivers stored in the driver storage region DS has been completed or not. When the testing for all the device drivers has been completed, the process advances to Step SA12 as directed by an arrow marked "YES", and the external device (the external device information of the external device) is added to the top of the user list CL2 as the unsupported device. Thereafter, the process advances to Step SA17. When the testing for all the device drivers has not been completed yet, the process returns to Step SA8 as directed by an arrow marked "NO", and the next device driver to be tested will be loaded.

At Step SA13, it is asked to the user that the user would like to use the external device without an operation guarantee. For example, the inquiry to the user may be executed by letting the user select from "use" or "not use" with displaying statement to the display 14, telling that an operation of the external device is not guaranteed. The reason why the operation of the external device is not guaranteed is that all the operations of the external device cannot be guaranteed in accordance with testing just one command sequence and an error may be occurred in some operations.

At Step SA14, it is judged whether the user selected to use the external device upon the inquiry at Step SA13 or not. When the user selected to use the external device, the process advances to Step SA15 as directed by an arrow marked "YES". When the user selected not to use the external device, the process advances to Step SA17 as directed by an arrow marked "NO".

At Step SA15, a relationship between the external device (the external device information) and the device driver by which the command sequence has been successfully executed at Step SA9 is added to the user list CL2. For example, the external device information and the driver ID are added to the user list CL2.

At Step SA16, the electric music apparatus 1 is set to use the external device by using the specific driver (the device driver found by searching at Step SA5 or SA7 or the device driver by which the command sequence has been successfully executed at Step SA9. The process at this step includes validation of functions using the external device and loading of the specific driver. Thereafter, the process advances to Step SA18 and the driver determination process will be terminated.

At Step SA17, the electric music apparatus 1 is set not to use the external device. Thereafter, the process advances to Step SA18 and the driver determination process will be terminated.

As described in the above, according to the embodiment of the present invention, a relationship between the external device 24 connected to the electric music device 1 and the supporting driver is registered in the user list CL2; therefore, it is unnecessary to re-test the operation of the external device 24 by using available drivers, and the driver to be used can be quickly determined automatically.

In addition, the external device 24 of which supporting driver is not stored in the electric music apparatus 1 is registered as the unsupported device; therefore, when the unsupported device is connected to the electric music apparatus 1, it will be instantly known that the connected external device cannot be used, and the testing time will not be wasted.

Although the external device 24 of which supporting driver is not stored in the electric music apparatus 1 is registered as the unsupported device, and it is judged whether the external device is the unsupported device or not at Step SA4 in FIG. 4 in the embodiment, the processes at Step SA4 and Step SA12 may be omitted in order to simplify the driver determination process.

Although the operation confirmed lists are the preset list CL1 and the user list CL2 in the embodiment, a list combining those two lists may be used. In this case, combined list will be stored in the rewritable storage device (medium), and the newly confirmed relationship between the external device and the device driver will be added to the combined list.

Although the searching in the user list CL2 is executed before the searching in the preset list CL1 in the embodiment, the searching in the preset list CL1 may be executed before the searching in the user list CL2.

Although the communication interface 21 is not necessary in the embodiment, when the electric music apparatus 1 is equipped with the communication interface 21 or a communication device such as a LAN adaptor, etc. is connected to the extended slot 23 as the external device 24, the electric music apparatus 1 may connect with the server 5 via the communication network 3 to update the preset list CL1, etc. and refer to the operation confirmed drivers lists stored in the server 5. By that, the electric music apparatus can handle a case that a device driver for the external device used with the electric music device has not been developed or that a genuine device driver for the external device cannot be installed due to specifications of the electric music apparatus 1 or the server 5.

The present invention has been described in connection with the preferred embodiments. The invention is not limited only to the above embodiments. It is apparent that various modifications, improvements, combinations, and the like can be made by those skilled in the art.

What are claimed are:

1. An electronic music apparatus, comprising:
   an interface to which an external device can connect;
   a memory that stores device drivers for operating external devices connected to the interface and a list recording a relationship between external devices and corresponding device drivers; and
   a processor comprising
      an obtaining device that obtains external device information from an external device connected to the interface;
      a searching device that searches a device driver corresponding to the connected external device with reference to the list in accordance with the obtained external device information;

a first judging device that judges the connected external device as an unsupported device and terminates an installing procedure if the connected external device is registered as an unsupported device;

a first determining device that, provided that the first judging device has not judged the connected external device as an unsupported device, determines to control the connected external device by using the device driver corresponding to the connected external device when the searching device detects the corresponding device driver from the list;

a second determining device that, provided that the first judging device has not judged the connected external device as an unsupported device and the searching device cannot detect the corresponding device driver, executes a specific command to the connected external device by sequentially using untested device drivers stored in the memory and determines to control the connected external device when one of the untested device drivers makes the external device respond to the specific command without an error;

an asking device asking a user whether or not the user would like to use the connected external device without an operation guarantee through the untested device driver that makes the external device respond to the specific command without an error; and a second judging device that judges the connected external device as an unsupported device when the connected external device does not respond to the specific command executed by the second determining device with all the device drivers stored in the memory without an error, wherein the memory stores a result of a judgment by the second judging device when the connected external device is judged as an unsupported device.

2. The electronic music apparatus according to claim 1, wherein the memory further stores a relationship between the connected external device and the device driver determined to be used by the second determining device.

3. The electronic music apparatus according to claim 1, wherein the second determining device uses every device driver stored in the memory to execute the specific command.

4. A non-transitory medium storing a computer program executed by an electronic music apparatus comprising an interface to which an external device can connect, and a memory that stores device drivers for operating external devices connected to the interface and a list recording a relationship between external devices and corresponding device drivers, the program comprising the instructions for:

(a) obtaining external device information from an external device connected to the interface;

(b) searching a device driver corresponding to the connected external device with reference to the list in accordance with the obtained external device information;

(c) judging the connected external device as an unsupported device and terminating an installing procedure if the connected external device is registered as an unsupported device;

(d) provided that the judging instruction (c) has not judged the connected external device as an unsupported device, determining to control the connected external device by using the device driver corresponding to the connected external device when the searching instruction (b) detects the corresponding device driver from the list; and (e) provided that the judging instruction (c) has not judged the connected external device as an unsupported device and the searching instruction (b) cannot detect the corresponding device driver, executing a specific command to the connected external device by sequentially using untested device drivers stored in the memory and determining to control the connected external device when one of the untested device drivers makes the external device respond to the specific command without an error;

(f) asking a user whether or not the user would like to use the connected external device without an operation guarantee through the untested device driver that makes the external device respond to the specific command without an error;

(g) judging the connected external device as an unsupported device when the connected external device does not respond to the specific command executed by the executing instruction (e) with all the device drivers stored in the memory without an error, and (h) storing in the memory a result of the judging instruction (g) when the connected external device is judged as an unsupported device.

5. The medium according to claim 4, wherein the instruction (e) uses every device driver stored in the memory to execute the specific command.

6. An installing method of an external device for an electronic music apparatus comprising an interface to which an external device can connect, and a memory that stores device drivers for operating external devices connected to the interface and a list recording a relationship between external devices and corresponding device drivers, the method comprising the steps of:

(a) obtaining external device information from an external device connected to the interface;

(b) searching a device driver corresponding to the connected external device with reference to the list in accordance with the obtained external device information;

(c) judging the connected external device as an unsupported device and terminating an installing procedure if the connected external device is registered as an unsupported device;

(d) provided that the judging step (c) has not judged the connected external device as an unsupported device, determining to control the connected external device by using the device driver corresponding to the connected external device when the searching step (b) detects the corresponding device driver from the list; and (e) provided that the judging step (c) has not judged the connected external device as an unsupported device and the searching step (b) cannot detect the corresponding device driver, executing a specific command to the connected external device by sequentially using untested device drivers stored in the memory and determining to control the connected external device when one of the untested device drivers makes the external device respond to the specific command without an error;

(f) asking a user whether or not the user would like to use the connected external device without an operation guarantee through the untested device driver that makes the external device respond to the specific command without an error;

(g) judging the connected external device as an unsupported device when the connected external device does not respond to the specific command executed by the executing instruction (e) with all the device drivers stored in the memory without an error, and (h) storing in the memory a result of the judging instruction (g) when the connected external device is judged as an unsupported device.

7. The method according to claim 6, wherein the step (e) uses every device driver stored in the memory to execute the specific command.

* * * * *